United States Patent
Aiura

(10) Patent No.: US 8,493,034 B2
(45) Date of Patent: Jul. 23, 2013

(54) CHARGE CONTROL CIRCUIT AND BATTERY CHARGER INCLUDING A CHARGE CONTROL CIRCUIT

(75) Inventor: Masami Aiura, Sendai (JP)

(73) Assignee: Freescale Semiconductor, Inc., Austin, TX (US)

( * ) Notice: Subject to any disclaimer, the term of this patent is extended or adjusted under 35 U.S.C. 154(b) by 587 days.

(21) Appl. No.: 12/748,466

(22) Filed: Mar. 29, 2010

(65) Prior Publication Data

US 2010/0264883 A1 Oct. 21, 2010

(30) Foreign Application Priority Data

Apr. 17, 2009 (JP) ................................. 2009-101344

(51) Int. Cl.
*H02J 7/04* (2006.01)

(52) U.S. Cl.
USPC .......................................................... 320/150

(58) Field of Classification Search
USPC .......................................................... 320/150
See application file for complete search history.

(56) References Cited

U.S. PATENT DOCUMENTS

| 4,341,988 A | 7/1982 | Small |
| 4,418,310 A | 11/1983 | Bollinger |
| 5,576,610 A * | 11/1996 | Patino et al. ............ 320/106 |
| 6,297,617 B1 | 10/2001 | Aoyama |
| 2002/0328078 | 12/2002 | Wolin |
| 2009/0058363 A1 | 3/2009 | Platania |

FOREIGN PATENT DOCUMENTS

JP 2007-159292 A 6/2007

* cited by examiner

*Primary Examiner* — Melissa Koval
*Assistant Examiner* — Daniel Miller
(74) *Attorney, Agent, or Firm* — Charles Bergere

(57) ABSTRACT

A charge control circuit for a battery charger that quickly detects an attachment state of a battery pack. The battery charger starts charging a battery pack and performs first and second temperature estimation processes. Then, the battery charger performs a first attachment detection process and when determining whether a battery is connected performs a third temperature estimation process. The battery charger performs a second attachment detection process and when determining whether the battery is connected performs a fourth temperature estimation process. The battery charger performs a third attachment detection process and when determining whether the battery is connected ends a single temperature scan and then repeats the routine starting from the first temperature estimation process.

6 Claims, 9 Drawing Sheets

FIG. 8A (PRIOR ART)
FIG. 8B (PRIOR ART)
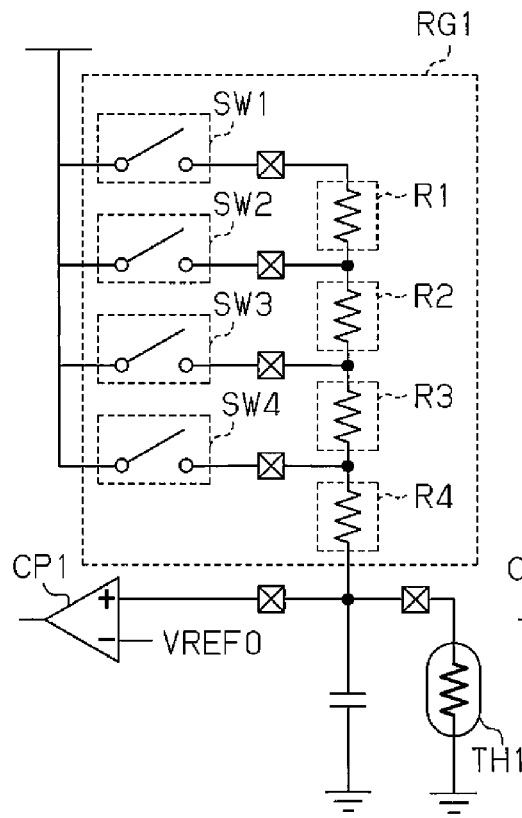
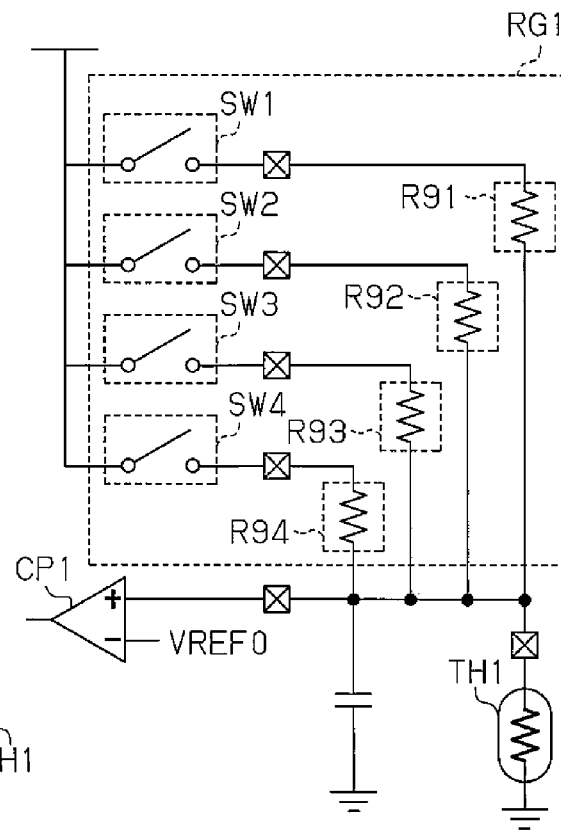
FIG. 8C (PRIOR ART)
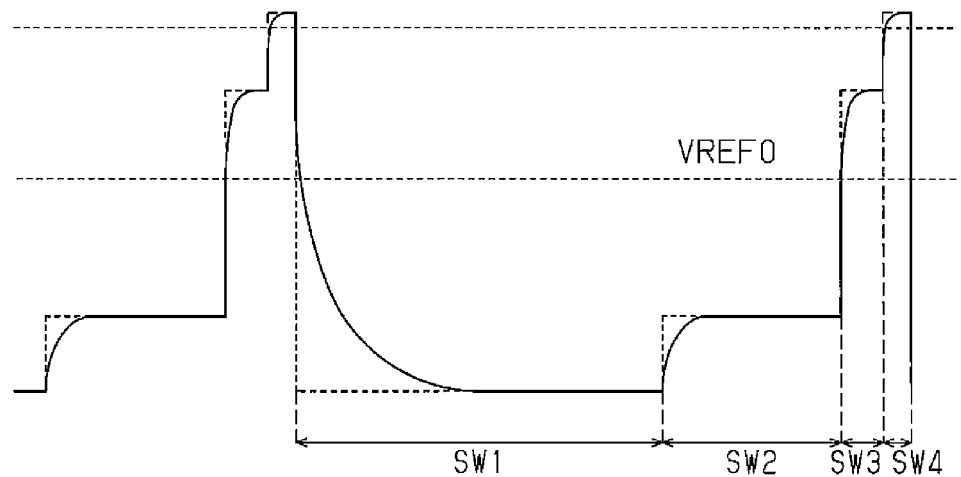

US 8,493,034 B2

CHARGE CONTROL CIRCUIT AND BATTERY CHARGER INCLUDING A CHARGE CONTROL CIRCUIT

BACKGROUND OF THE INVENTION

The present invention relates to a charge control circuit for a battery charger and a battery charger including such a charge control circuit.

These days many types of electronic devices use rechargeable batteries, such as a lithium ion battery. For safe charging of such a lithium ion battery, the charge current must be controlled by monitoring the temperature of a battery pack (for example, refer to Japanese Laid-Open Patent Publication No. 2003-199262, page 1 and FIG. 1). Japanese Laid-Open Patent Publication No. 2003-199262 discusses a technique for charging, discharging, and recharging a battery in an environment in which thermal conditions change readily. A battery charger, which charges a battery, includes a charging circuit and a temperature sensor. The charging circuit has a charge current output coupled to a battery. The temperature sensor detects the temperature of the battery. The temperature sensor and the charging circuit are used to set the charge current in accordance with the battery temperature.

A structure for estimating temperature will now be discussed with reference to FIGS. 7A to 7C. As shown in FIG. 7A, a battery pack 10 includes a battery cell CL1 and a thermistor TH1. The thermistor TH1 has a negative temperature coefficient (NTC) and measures the temperature based on the resistivity, which varies in accordance with the temperature. A battery charger 40 performs charge control using a plurality of temperature threshold values for the charge current, as shown in FIG. 7B, and the charge voltage, as shown in FIG. 7C. For example, the current or voltage is restricted in the low temperature range of temperatures T1 to T2, the standard temperature range of temperatures T2 to T5, and the high temperature range of temperatures T5 to T6. Temperatures T3 to T4 is the optimal temperature range for charging.

To estimate the resistance of the thermistor TH1, which is used to execute control that is in accordance with the temperature, the battery charger includes a resistor group RG1 that corresponds with the temperature threshold value. The resistor group RG1 may be of a series type or a parallel type. As shown in FIG. 8A, a series type includes a plurality of resistors R1 to R4, which are connected in series. A group of switches (switches SW1 to SW4) supplies voltage to each connection node of the resistors. As shown in FIG. 8B, a parallel type includes resistors R91 to R94, which are connected in parallel, and switches SW1 to SW4, which supply the resistors with voltage.

In the battery charger 40, reference voltage V0 is supplied to the thermistor TH1 via the resistor group RG1. In this case, the voltage at an external terminal TM2 (voltage between the two terminals of the thermistor TH1) is determined by the combined resistance of the resistors R1 to R4 or the resistances of the resistors R91 to R94 and the resistance of the thermistor TH1. A comparator CP1 compares the voltage at the external terminal TM2 with a temperature measurement reference voltage VREF0 to estimate the temperature threshold value of the battery pack 10.

Referring to FIG. 8C, during a temperature scan that sequentially closes the switches SW1 to SW4, the resistor group RG1 is connected to the thermistor TH1 to detect the temperature threshold value. To perform charging, the battery pack 10 must be attached to the battery charger 40. When charging starts in a state in which the battery pack 10 is not attached, a large load is applied to the battery charger 40. Thus, various ways to check that the battery pack 10 has been attached to the battery charger 40 have been discussed (refer to, for example, Japanese Laid-Open Patent Publication No. 2007-159292, page 1, FIGS. 3 and 4). Japanese Laid-Open Patent Publication No. 2007-159292 describes a technique using a mechanical switch, which is arranged in a housing of the battery charger 40. Referring to FIG. 9A, when a mechanical switch 500, which includes a movable contact, is pushed and the attachment of the battery pack 10 is thereby detected, a switch 501 closes. The structure shown in FIG. 9A requires a mechanical switch. This may results in problems concerning the mechanical strength and reliability.

Japanese Laid-Open Patent Publication No. 2007-159292 also describes a method for detecting attachment by measuring a terminal voltage of the thermistor TH1, as shown in FIG. 9B, which uses the thermistor TH1 in the battery pack. The thermistor TH1 is connected to ground in the battery pack 10, and the voltage goes lower than the reference voltage when the battery pack 10 is connected. Accordingly, connection of the battery may be detected by comparing the voltage obtained by subtracting an error voltage V5 from the reference voltage V0 with a threshold value. The output of the comparator is HIGH when the battery is not connected and LOW when the battery is connected.

Generally, a large capacitor is connected to the battery charger to prevent ESD stress. The system in FIG. 9A uses a capacitor of approximately 0.1 µF. This increases the CR time constant and requires a long time for a single cycle of a temperature scan, which sequentially switches the resistor connected to the thermistor TH1 for comparison with a threshold value.

Accordingly, a delay in detection would occur when the battery attachment detection is performed for each cycle of the temperature scan. Further, since the resistance of the thermistor varies with temperature, the temperature estimation accuracy decreases as the scan time decreases to perform detection within a short period of time.

BRIEF DESCRIPTION OF THE DRAWINGS

The invention, together with objects and advantages thereof, may best be understood by reference to the following description of the presently preferred embodiments together with the accompanying drawings in which:

FIG. 8A is a schematic diagram showing a conventional series type battery charger, FIG. 8B is a schematic diagram showing a conventional parallel type battery charger, and FIG. 8C is a timing chart of the voltage applied to the thermistor in the circuits of FIGS. 8A and 8B.

DETAILED DESCRIPTION OF THE PREFERRED EMBODIMENTS

Figure 1:
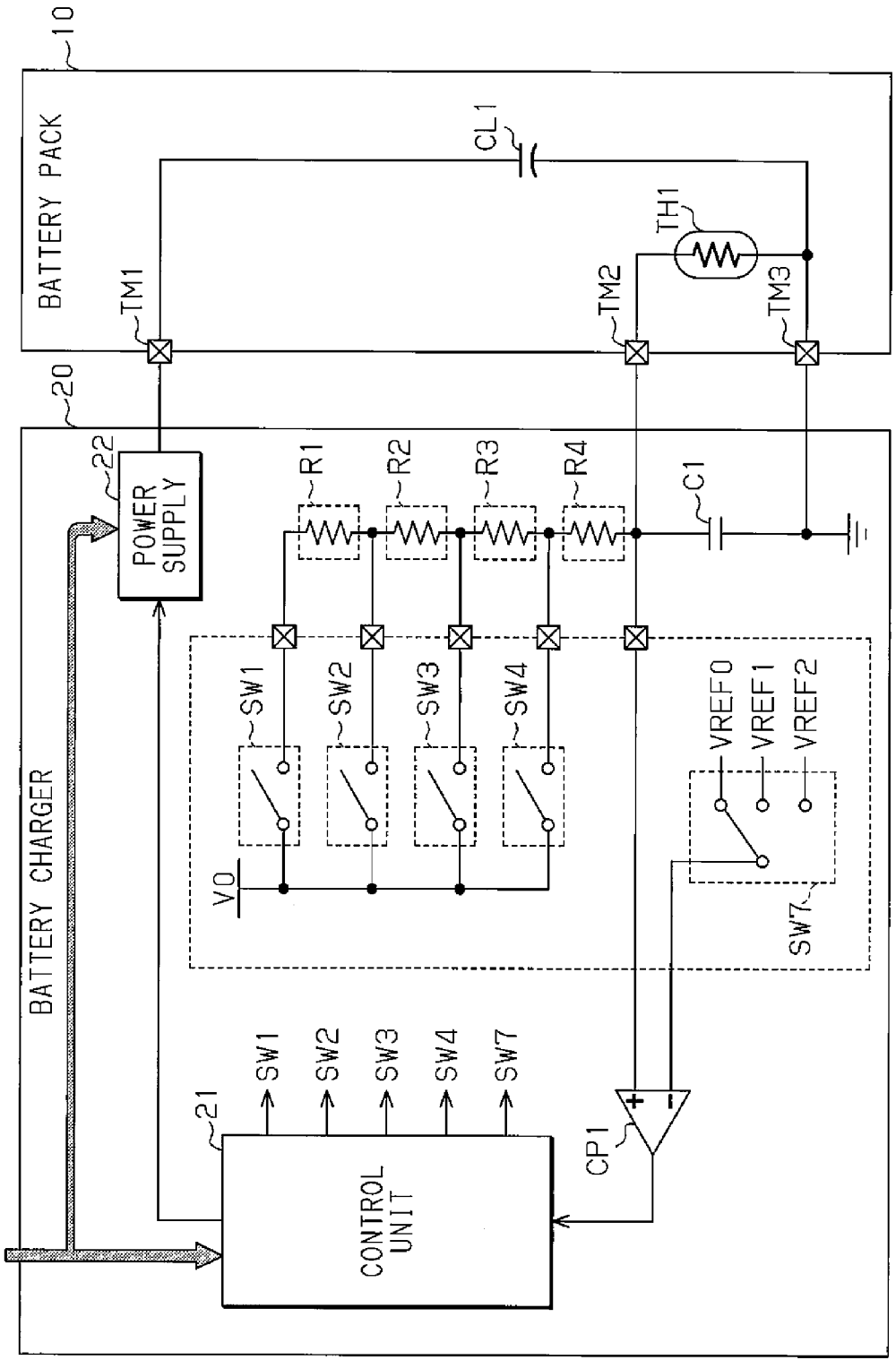
FIG. 1 is a schematic diagram showing the structure of a battery charger according to one embodiment of the present invention.

The present invention provides a charge control circuit that detects the attachment state of a battery pack in a very short period of time, and a battery charger including such a charge control circuit.

One aspect of the present invention is a charge control circuit including a plurality of resistor groups connected to a thermistor, for measuring a temperature of a battery. A first switching unit connects resistors having different resistances in series to the thermistor in the resistor groups. A comparator obtains a voltage at a connection node of the resistors and thermistor and outputs a comparison result of the node voltage and a reference voltage. A second switching unit supplies the comparator with a temperature reference voltage and an attachment reference voltage. A control unit controls the first and second switching units and the charging of the battery based on the comparison result. The control unit performs a temperature scan that sequentially repeats a temperature estimation process, which connects the resistors having different resistances in the first switching unit, supplies the comparator with the temperature reference voltage from the second switching unit, and obtains the comparison result. The temperature scan performs, between the temperature estimation processes, an attachment detection process a plurality of times. The attachment detection process supplies the comparator with the attachment reference voltage and compares the voltage at the connection node with the attachment reference voltage.

A further aspect of the present invention is a battery charger including a charge control circuit. The charge control circuit has a power supply that supplies a battery with current. A plurality of resistor groups is connected to a thermistor, which is for measuring a temperature of the battery. A first switching unit connects resistors having different resistances in series to the thermistor in the resistor groups. A comparator obtains a node voltage at a connection node of the resistors and thermistor and outputs a comparison result of the node voltage and a reference voltage. A second switching unit supplies the comparator with a temperature reference voltage and an attachment reference voltage. A control unit controls the first and second switching units and controls charging of the battery based on the comparison result. The control unit performs a temperature scan that sequentially repeats a temperature estimation process, which connects the resistors having different resistances in the first switching unit, supplies the comparator with the temperature reference voltage from the second switching unit, and obtains the comparison result. The temperature scan performs, between the temperature estimation processes, an attachment detection process a plurality of times, in which the attachment detection process supplies the comparator with the attachment reference voltage and compares the voltage at the connection node with the attachment reference voltage.

Other aspects and advantages of the present invention will become apparent from the following description, taken in conjunction with the accompanying drawings, illustrating by way of example the principles of the invention.

A charge control circuit according to one embodiment of the present invention will now be discussed with reference to FIGS. 1 to 6. In the present embodiment, to charge a battery, the temperature state of a battery pack is estimated, and the attachment state of the battery pack is detected.

As shown in FIG. 1, the battery pack 10 includes a battery cell CL1 and a thermistor TH1. The battery cell CL1 is connected to external terminals TM1 and TM3. Current for charging the battery cell CL1 is supplied from the external terminal TM1. The external terminal TM3 is a common terminal supplied with ground voltage. The thermistor TH1 is connected to an external terminal TM2 and the external terminal TM3. The external terminal TM2 is supplied with voltage for estimating the resistance of the thermistor TH1 from a battery charger 20.

The battery charger 20 includes a power supply 22, which charges the battery cell CL1, resistors R1 to R4, which are used to estimate the temperature state, a comparator CP1, and a control unit 21.

The power supply 22 is a current source for supplying current having a current value corresponding to the temperature state of the battery pack 10.

The resistors R1 to R4 form resistor groups for estimating the resistance of the thermistor TH1 in the battery pack 10. The present embodiment has a series-type resistor group structure, in which the resistors R1 to R4 are connected in series. A switch SW1 is connected to one end of the uppermost stage resistor R1. A switch SW2 is connected between the other end of the resistor R1 and one end of the resistor R2. A switch SW3 is connected between the other end of the resistor R2 and one end of the resistor R3. A switch SW4 is connected between the other end of the resistor R3 and one end of the resistor R4. The switches SW1 to SW4 function as a first switching unit supplied with reference voltage V0.

Further, the other end of the resistor R4 is connected to the external terminal TM2 of the battery pack 10. Thus, the reference voltage V0 is divided into voltages corresponding to the combined resistances of the resistors R1 to R4 and the resistance of the thermistor TH1.

The other end of the resistor R4 is also grounded via a capacitor C1. The capacitor C1 is used to absorb sudden voltage changes (ESD) when the switches SW1 to SW4 switch the connection state of the resistors.

Additionally, the other end of the resistor R4 is connected to a non-inverting input terminal of the comparator CP1. Accordingly, the voltage (node voltage) obtained by dividing the reference voltage V0 in correspondence with the combined resistances of the resistors R1 to R4 and the resistance of the thermistor TH1 is input to the comparator CP1.

A switch SW7, which serves as a second switching unit, is connected to an inverting input terminal of the comparator CP1. The switch SW7 switches its connection between terminals supplying a temperature measurement reference voltage VREF0, a first attachment detection reference voltage VREF1, and a second attachment detection reference voltage VREF2.

The temperature measurement reference voltage VREF0 is a temperature reference voltage for estimating the resistance of the thermistor TH1. The first and second attachment detection reference voltages VREF1 and VREF2 are each attachment reference voltages used to determine the attachment state. In the present embodiment, the second attachment detection reference voltage VREF2 is higher than the first attachment detection reference voltage VREF1.

The control unit 21, which functions as a temperature measurement circuit, outputs a signal for synchronizing and controlling the switches SW1 to SW4 and SW7. Further, the control unit 21 retrieves an output signal from the comparator CP1. Then, the control unit 21 executes controls in accordance with the temperature state and attachment state of the battery pack 10 during charging.

[Processing Procedures]

Figure 2:
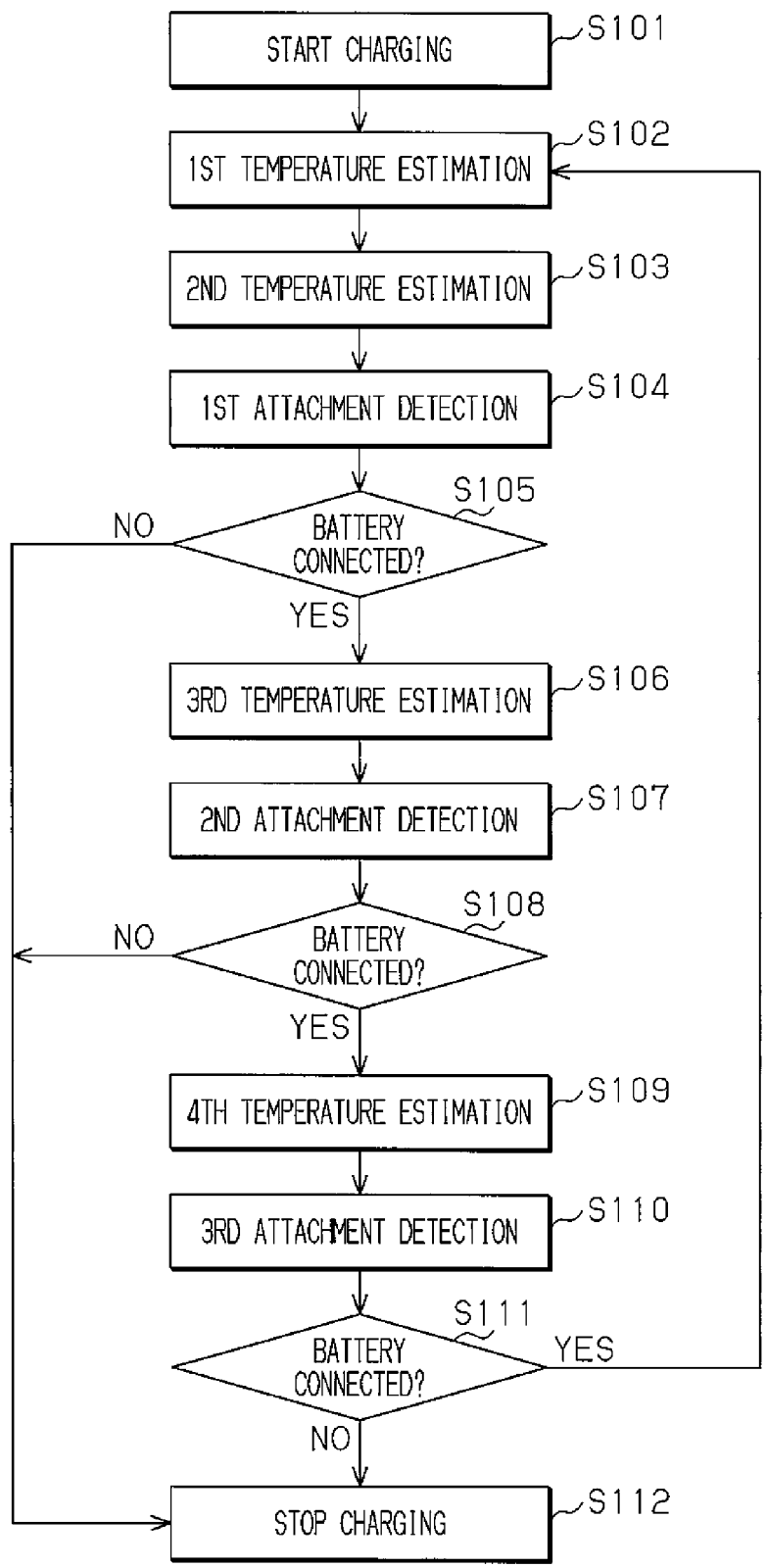
FIG. 2 is a flow chart showing a method of performing temperature estimation and battery charger attachment detection.

The procedures of the processing performed by the battery charger 20 will now be described with reference to FIG. 2. In the present embodiment, a temperature scan is performed by performing a temperature estimation process four times. First, the battery charger 20 performs a process for starting charging (step S101). More specifically, the control unit 21 of the battery charger 20 instructs the power supply 22 to supply the battery pack 10 with charge current. When charging starts, temperature estimation and battery attachment detection are also started.

Figure 3A:
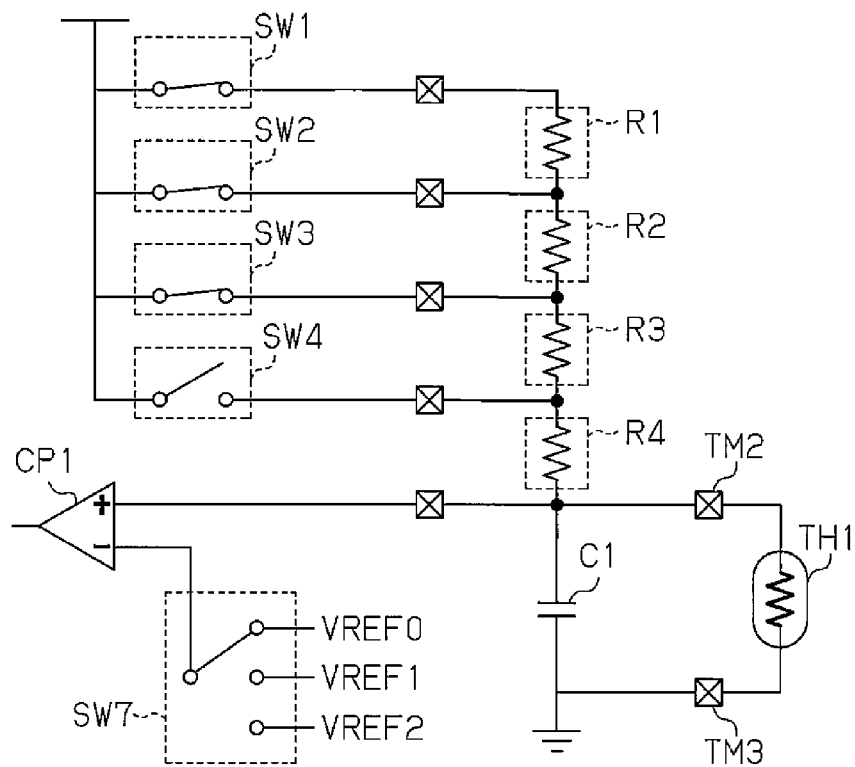
FIGS. 3A and 3B are schematic diagrams showing operational states of the battery charger during first and second temperature estimations.

Then, the battery charger 20 performs a first temperature estimation process (step S102). More specifically, the control unit 21 of the battery charger 20 closes the switches SW1 to SW3, as shown in the state of FIG. 3A. In this case, the thermistor TH1 is supplied with current via the resistors R3 and R4. Further, the control unit 21 connects the switch SW7 to the terminal that supplies the temperature measurement reference voltage VREF0. Then, the control unit 21 waits for a predetermined time (waiting time T1) that is longer than the CR time constant of the resistors R3, R4 and the capacitor C1. After the waiting time elapses, the comparator CP1 compares the voltage at the external terminal TM2 with the temperature measurement reference voltage VREF0. The control unit 21 obtains the comparison result from the comparator CP1 and controls the charge current based on the temperature of the comparison result.

Figure 3B:
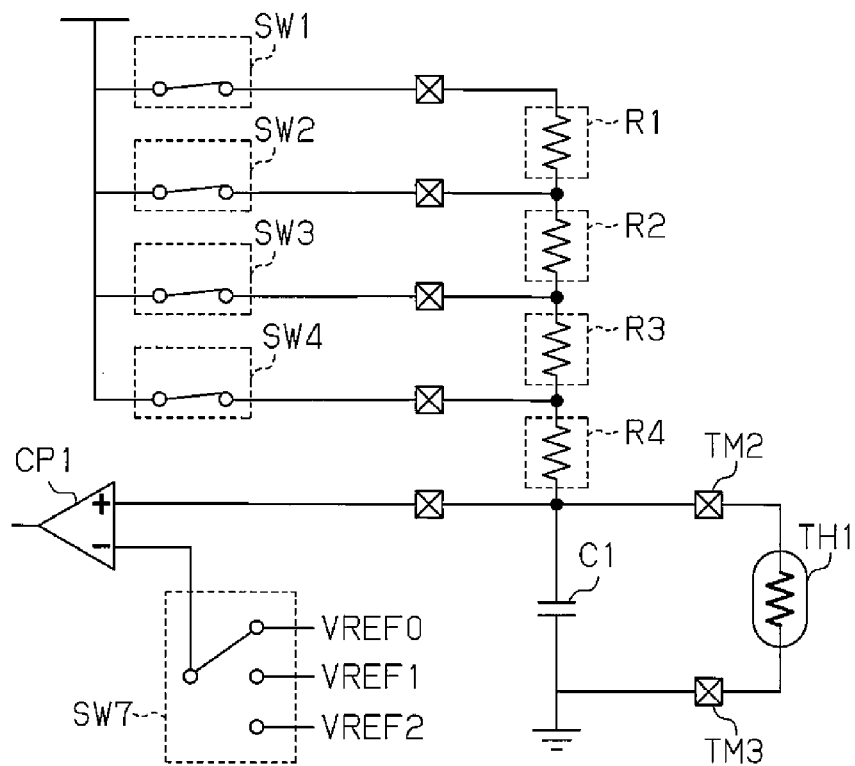

The battery charger 20 then performs a second temperature estimation process (step S103). More specifically, the control unit 21 of the battery charger 20 closes the switches SW1 to SW4, as shown in the state of FIG. 3B. In this case, the thermistor TH1 is supplied with current via the resistor R4. Further, the control unit 21 connects the switch SW7 to the terminal that supplies the temperature measurement reference voltage VREF0. Then, the control unit 21 waits for a predetermined time (waiting time T2) that is longer than the CR time constant of the resistor R4 and the capacitor C1. In this case, the CR time constant is decreased. Thus, the waiting time T2 is set to be shorter than the waiting time T1. After the waiting time elapses, the comparator CP1 compares the voltage at the external terminal TM2 with the temperature measurement reference voltage VREF0. The control unit 21 obtains the comparison result from the comparator CP1 and controls the charge current based on the temperature of the comparison result.

Figure 4A:
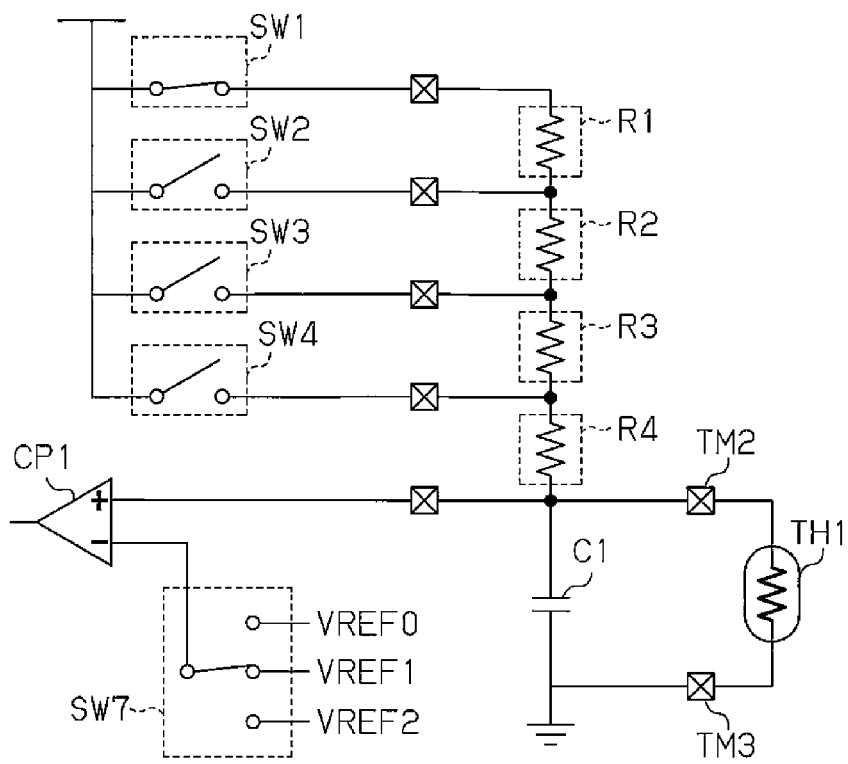
FIGS. 4A and 4B are schematic diagrams showing the operational state of the battery charger during a first attachment detection and a third temperature estimation, respectively.

The battery charger 20 then performs a first attachment detection process (step S104). More specifically, the control unit 21 of the battery charger 20 closes the switch SW1, as shown in the state of FIG. 4A. In this case, the thermistor TH1 is supplied with current via the resistors R1 to R4. Further, the control unit 21 connects the switch SW7 to the terminal that supplies the first attachment detection reference voltage VREF1. Then, the control unit 21 waits for a predetermined time (waiting time TD1) that is longer than the CR time constant of the resistors R1 to R4 and the capacitor C1. After the waiting time elapses, the comparator CP1 compares the voltage at the external terminal TM2 with the first attachment detection reference voltage VREF1. The control unit 21 obtains the comparison result from the comparator CP1.

In this case, the battery charger 20 performs a process for determining whether or not the battery is connected (step S105). More specifically, the control unit 21 of the battery charger 20 determines that the battery is connected when the voltage at the external terminal TM2 is lower than the first attachment detection reference voltage VREF1.

When the voltage at the external terminal TM2 is higher than the first attachment detection reference voltage VREF1 and the control unit 21 determines that the battery is not connected (NO in step S105), the battery charger 20 stops charging (step S112). More specifically, the control unit 21 of the battery charger 20 instructs the power supply 22 to stop supplying the battery pack 10 with charge current. In this case, the control unit 21 ends the temperature estimation process and continues the battery attachment detection process. When a newly attached battery pack 10 is detected, the battery charger 20 restarts the battery detection process and the temperature estimation process.

Figure 4B:
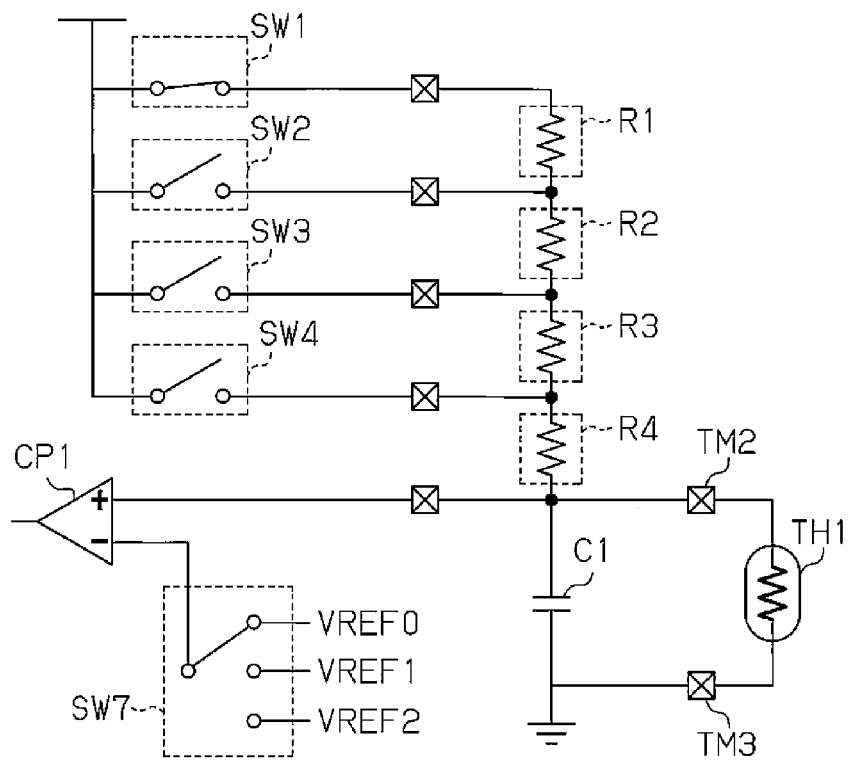

When the voltage at the external terminal TM2 is lower than the first attachment detection reference voltage VREF1 and the control unit 21 determines that the battery is connected (YES in step S105), the battery charger 20 performs a third temperature estimation process (step S106). More specifically, the control unit 21 of the battery charger 20 closes the switch SW1, as shown in the state of FIG. 4B. In this case, the thermistor TH1 is supplied with current via the resistors R1 to R4. Further, the control unit 21 connects the switch SW7 to the terminal that supplies the temperature measurement reference voltage VREF0. Then, the control unit 21 waits for a predetermined time (waiting time T3) that is longer than the CR time constant of the resistors R1 to R4 and the capacitor C1. In this case, the CR time constant is increased. Thus, the waiting time T3 is set to be longer than the waiting times T1 and T2. After the waiting time elapses, the comparator CP1 compares the voltage at the external terminal TM2 with the temperature measurement reference voltage VREF0. The control unit 21 obtains the comparison result from the comparator CP1 and controls the charge current based on the temperature of the comparison result.

Figure 5A:
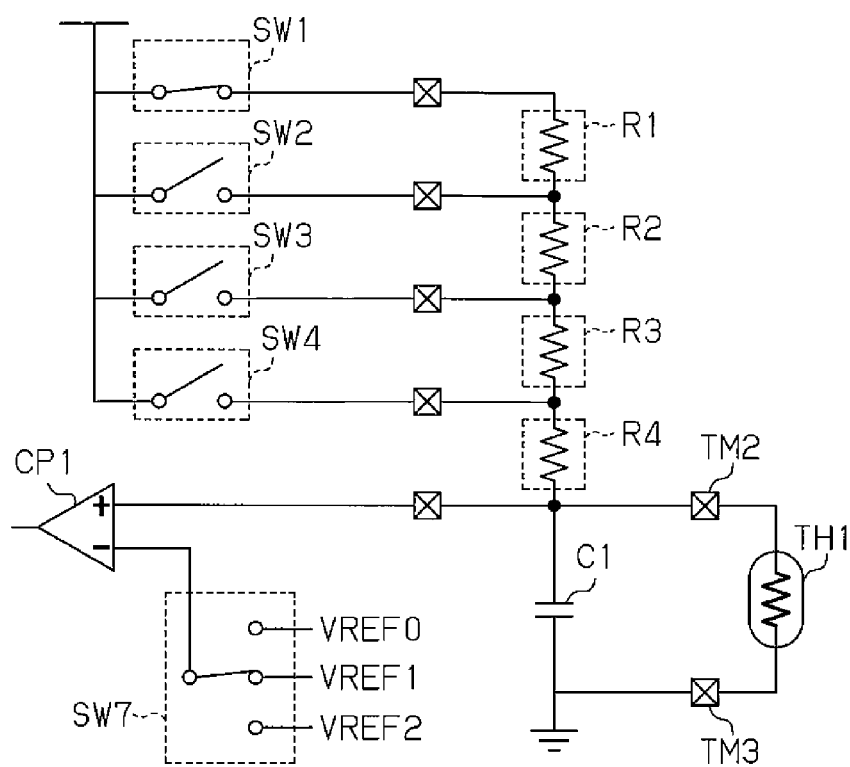
FIGS. 5A and 5B are schematic diagrams showing the operational states of the battery charger during a second attachment detection and a fourth temperature estimation, respectively.

The battery charger 20 then performs a second attachment detection process (step S107). More specifically, the control unit 21 of the battery charger 20 closes the switch SW1, as shown in the state of FIG. 5A. In this case, the thermistor TH1 is supplied with current via the resistors R1 to R4. Further, the control unit 21 connects the switch SW7 to the terminal that supplies the first attachment detection reference voltage VREF1. Then, the control unit 21 waits for a predetermined time (waiting time TD2) that is longer than the CR time constant of the resistors R1 to R4 and the capacitor C1. After the waiting time elapses, the comparator CP1 compares the voltage at the external terminal TM2 with the first attachment detection reference voltage VREF1. The control unit 21 obtains the comparison result from the comparator CP1.

In this case, the battery charger 20 performs a process for determining whether or not the battery is connected (step S108). More specifically, the control unit 21 of the battery charger 20 determines that the battery is connected when the voltage at the external terminal TM2 is lower than the first attachment detection reference voltage VREF1.

When the voltage at the external terminal TM2 is higher than the first attachment detection reference voltage VREF1 and the control unit 21 determines that the battery is not connected (NO in step S108), the battery charger 20 stops charging (step S112).

Figure 5B:
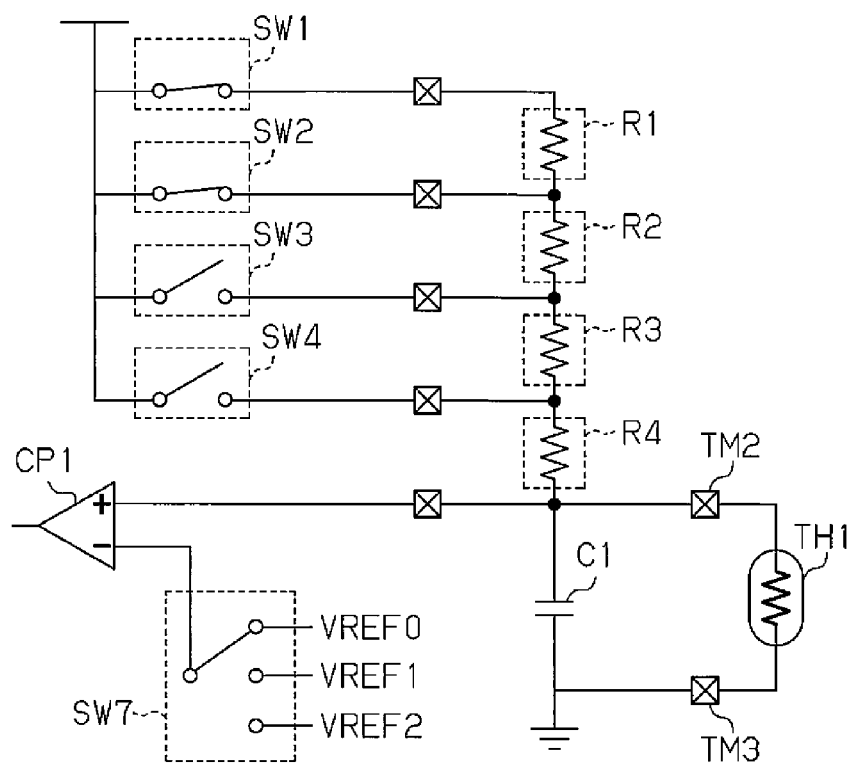

When the voltage at the external terminal TM2 is lower than the first attachment detection reference voltage VREF1 and the control unit 21 determines that the battery is connected (YES in step S108), the battery charger 20 performs a fourth temperature estimation process (step S109). More specifically, the control unit 21 of the battery charger 20 closes the switches SW1 and SW2, as shown in the state of FIG. 5B. In this case, the thermistor TH1 is supplied with current via the resistors R2 to R4. Further, the control unit 21 connects the switch SW7 to the terminal that supplies the temperature measurement reference voltage VREF0. Then, the control unit 21 waits for a predetermined time (waiting time T4) that is longer than the CR time constant of the resistors R2 to R4 and the capacitor C1. In this case, the CR time constant is increased. Thus, the waiting time T4 is set to be longer than the waiting times T1 and T2 but shorter than the waiting time T3. After the waiting time elapses, the comparator CP1 compares the voltage at the external terminal TM2 with the temperature measurement reference voltage VREF0. The control unit 21 obtains the comparison result from the comparator CP1 and controls the charge current based on the temperature of the comparison result.

Figure 6:
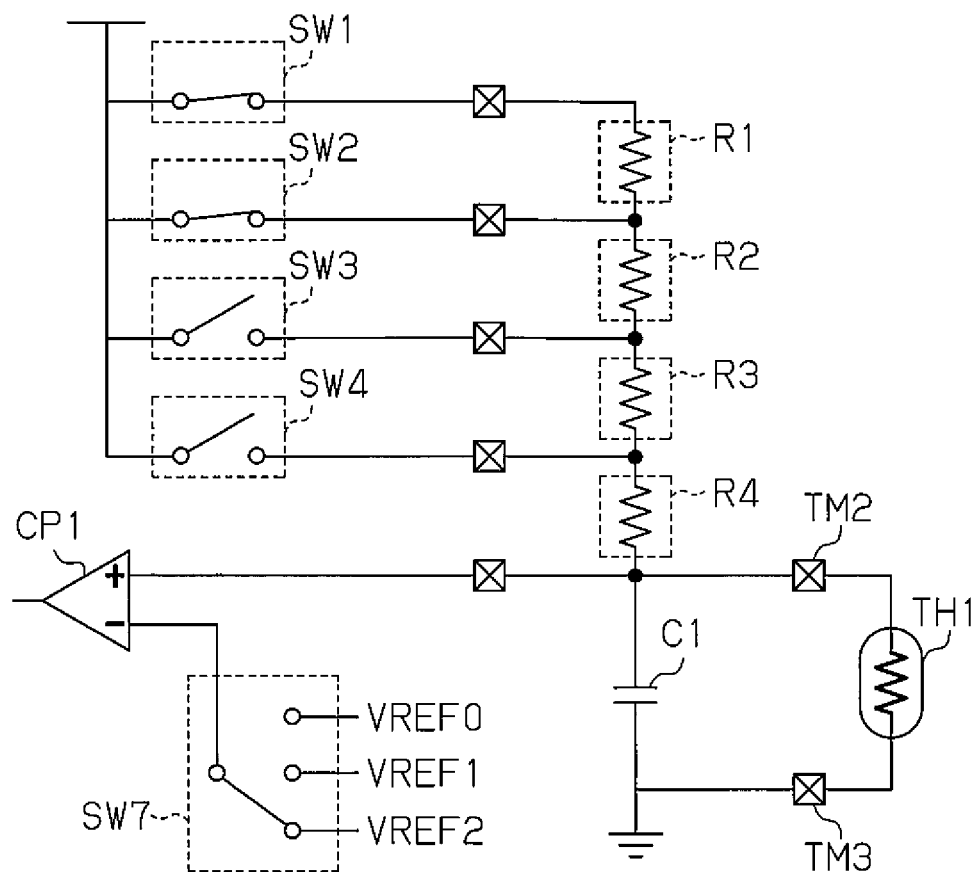
FIG. 6 is a schematic diagram showing the operational state of the battery charger during a third attachment detection.
Figure 7A:
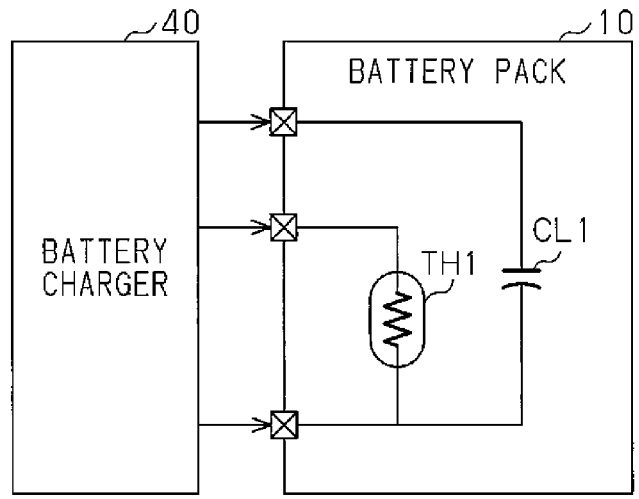
FIG. 7A is a schematic diagram showing the connection of a conventional battery pack to a conventional battery charger.
Figure 7B:
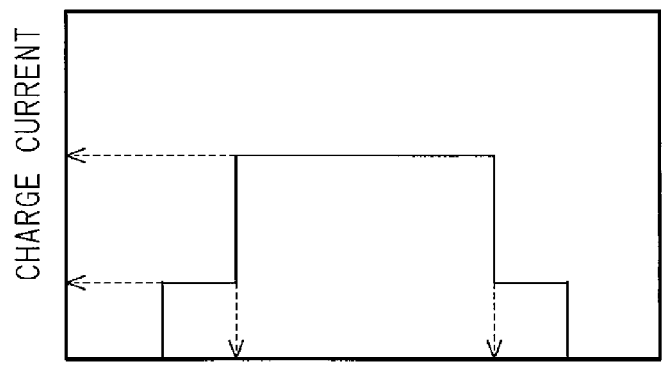
FIG. 7B is a charge current chart for the battery charger of FIG. 7A.
Figure 7C:
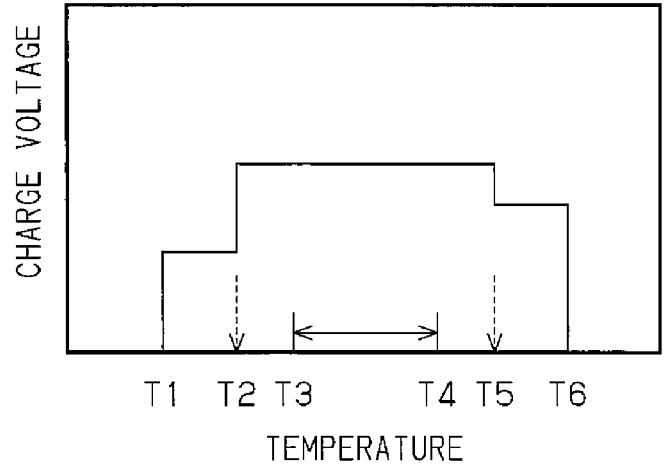
FIG. 7C is a charge voltage chart for the battery charger of FIG. 7A.
Figure 9A:
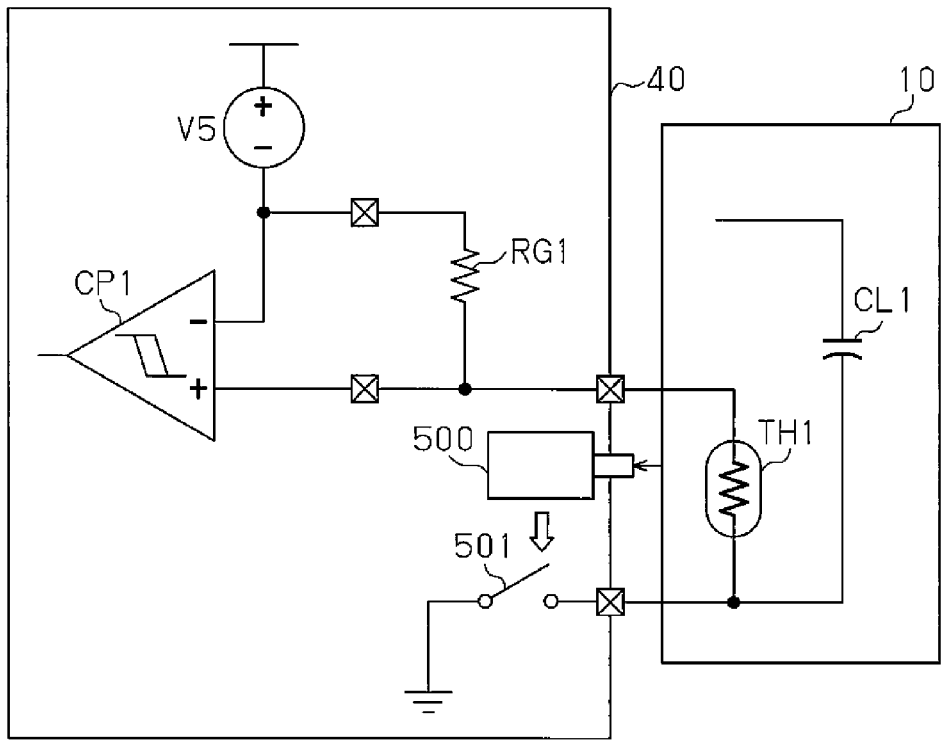
FIGS. 9A and 9B are schematic circuit diagrams showing a conventional structure with a mechanical switch to detect attachment of a battery pack, and a conventional structure using the voltage of a thermistor to detect attachment of a battery pack.
Figure 9B:
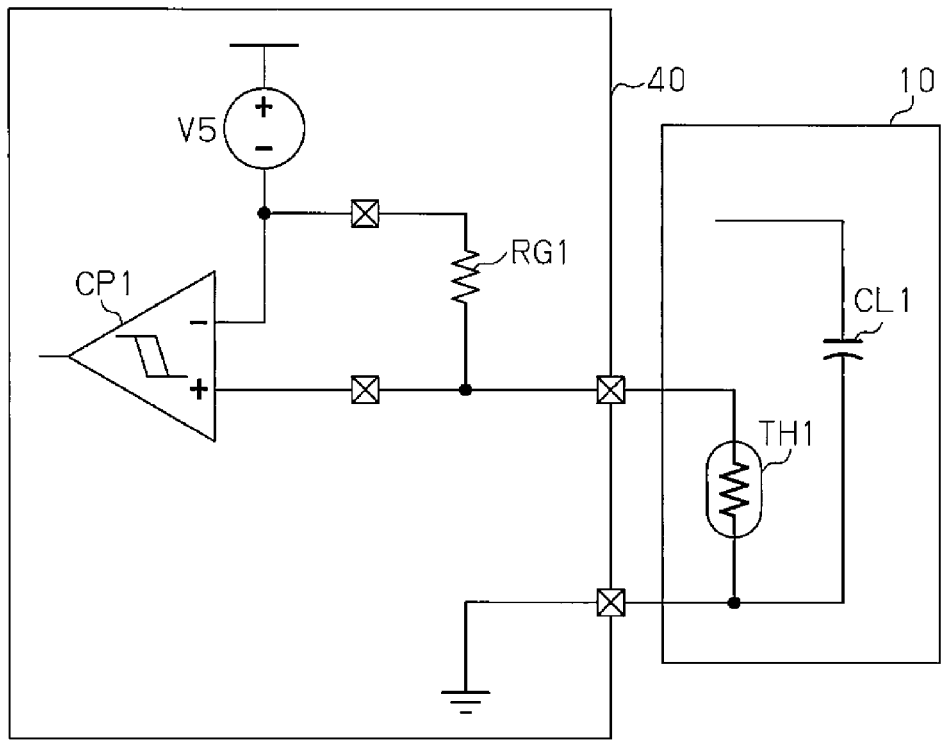

The battery charger 20 then performs a third attachment detection process (step S110). More specifically, the control unit 21 of the battery charger 20 closes the switches SW1 and SW2, as shown in the state of FIG. 6. In this case, the thermistor TH1 is supplied with current via the resistors R2 to R4. Further, the control unit 21 connects the switch SW7 to the terminal that supplies the second attachment detection reference voltage VREF2. Then, the control unit 21 waits for a predetermined time (waiting time TD2) that is longer than the CR time constant of the resistors R2 to R4 and the capacitor C1. After the waiting time elapses, the comparator CP1 compares the voltage at the external terminal TM2 with the second attachment detection reference voltage VREF2. The control unit 21 obtains the comparison result from the comparator CP1.

In this case, the battery charger 20 performs a process for determining whether or not the battery is connected (step S111). More specifically, the control unit 21 of the battery charger 20 determines that the battery is connected when the voltage at the external terminal TM2 is lower than the second attachment detection reference voltage VREF2.

When the voltage at the external terminal TM2 is lower than the second attachment detection reference voltage VREF2 and the control unit 21 determines that the battery is connected (YES in step S111), the battery charger 20 ends the temperature scan and repeats this routine from the first temperature estimation process (step S102) shown in the state of FIG. 3A. The temperature estimation process and the attachment detection process described above are continuously performed until charging of the battery pack 10 ends.

The temperature measurement circuit of the embodiment has the following advantages. The battery charger 20 performs a temperature scan, which includes the first to fourth temperature estimation processes (steps S102, S103, S106, and S109). When repeating the temperature scan, the battery charger 20 performs the first to third attachment detection processes (steps S104, S107, and S110). This readily detects the attachment state of the battery pack 10 with respect to the temperature estimation process during a single cycle.

Particularly, when repeating the second to fourth temperature estimation processes (steps S103, S106, and S109), the battery charger 20 performs the first to third attachment detection processes (steps S104, S107, and S110). During the second to fourth temperature estimation processes (steps S103, S106, and S109), the resistance of the resistor group increases. This increases the CR time constant. Thus, time is required for the temperature measurement to become stable and accurate. By performing the attachment detection process during this interval, attachment detection is quickly performed.

The inverting input terminal of the comparator CP1 is connected to the switch SW7. The switch SW7 switches its connection between terminals supplying the temperature measurement reference voltage VREF0, the first attachment detection reference voltage VREF1, and the second attachment detection reference voltage VREF2. The second attachment detection reference voltage VREF2 is higher than the first attachment detection reference voltage VREF1. As a result, accurate comparisons are performed in correspondence with the resistors of the resistor group connected to the thermistor TH1.

The battery charger 20 performs the first and second attachment detection processes (steps S104 and S107) before and after the third temperature estimation process (step S106). Thus, even when the resistance of the resistor group and the CR time constant are both large, the number of times resistors are switched is decreased, and the temperature estimation and attachment detection are performed in a stable state.

The first to third attachment detection processes (step S104, S107, and S110) are performed in the embodiment discussed above. The frequency in which the attachment detection processes are performed between temperature estimation processes is varied in accordance with the resistors of the resistor group connected to the thermistor TH1. Specifically, when connecting resistors having a low resistance, the number of times the attachment detection process is performed relative to the number of times the temperature estimation process is performed is less than when the resistance is high. Thus, during temperature measurement that is performed when the CR time constant is small, the attachment detection is performed after the temperature estimation is performed for a plural number of times. During temperature estimation performed when the time constant is large, the attachment detection is performed whenever the temperature estimation is performed. Accordingly, the attachment detection processes are performed in equal time intervals.

It should be apparent to those skilled in the art that the present invention may be embodied in many other specific forms without departing from the spirit or scope of the invention. Particularly, it should be understood that the present invention may be embodied in the following forms.

In the embodiment discussed above, the battery charger is of a series type in which dividing resistors are connected in series. However, the dividing resistors do not have to be connected in series and may be connected in parallel to form a parallel type battery charger. Further, in the temperature estimation processes, "the switches SW1 to SW4", "the switches SW1 to SW3", "the switches SW1 and SW2", or "the switch SW1" are closed. However, the closing of the switches is not limited to such combinations. For example, the switches SW1 to SW4 may be closed one by one.

Operation states are sequentially changed. However, the order of the operation states is not limited to the order of the embodiment discussed above. It is only required that the operational states all be combined and sequentially tested.

The four resistors R1 to R4 are used as dividing resistors corresponding to temperatures T1 to T4. However, the subject of estimation is not limited to four temperatures. In this case, the number of resistors should be in correspondence with the number of estimated temperatures, and an operation state for estimating each resistor is set.

The battery charger 20 performs the process for starting charging (step S101), the first temperature estimation process (step S102), the second temperature estimation process (step S103), and then the first attachment detection process (step 104). Instead, the charging may be started after performing the attachment detection process. In this case, the first attachment detection process is first repetitively performed a plural number of times by closing the switch SW1, as shown in the state of FIG. 4A. Then, the control unit 21 waits for a predetermined time (waiting time TD1) that is longer than the CR time constant of the resistors R1 to R4 and the capacitor C1 and obtains the comparison result of the voltage at the external terminal TM2 and the first attachment detection reference voltage VREF1 from the comparator CP1. During the repetition of this process, the control unit 21 of the battery charger 20 counts the number of times the battery is determined as being connected. When the number of times the battery connection is consecutively detected exceeds an attachment determination reference number (e.g., three), the control unit 21 sequentially performs the temperature estimation process and the attachment detection process. This allows for the temperature estimation process and battery charging to be performed while ensuring battery attachment detection.

When determining that the battery is not connected (NO in steps S105, S108, or S111), the battery charger 20 stops charging (step S112). Instead, the charging may be stopped based on the results of a plurality of attachment detection processes. More specifically, the control unit 21 of the battery charger 20 counts the number of times the battery is consecutively determined as not being connected. When the number of times the battery connection cannot be consecutively detected exceeds a detachment determination reference number (e.g., three), the battery charger 20 determines that the battery is not connected and stops charging. This allows for charging to be stopped upon detection of battery detachment.

The temperature scan is conducted by performing four temperature estimation processes, namely, the first temperature estimation process (step S102), the second temperature estimation process (step S103), the third temperature estimation process (step S106), and the fourth temperature estimation process (step S109). Further, the control unit 21 obtains the comparison result of the comparator CP1 and controls the charge current based on the temperature of the comparison result. However, the temperature determined in the temperature scan is not limited in such a manner, and the temperature may be determined by performing the temperature scan a plural number of times. For example, an average value or median value for a plurality of temperature scans may be used. Alternatively, the temperature may be updated when it is greater than or equal to a reference number.

The present examples and embodiments are to be considered as illustrative and not restrictive, and the invention is not to be limited to the details given herein, but may be modified within the scope and equivalence of the appended claims.

What is claimed is:

1. A charge control circuit, comprising:
a plurality of resistor groups connectable to a thermistor for measuring a temperature of a battery;
a first switching unit that connects resistors in the resistor groups having different resistances in series to the thermistor;
a comparator that obtains a node voltage at a connection node of the resistors and thermistor and outputs a comparison result of the node voltage and a reference voltage;
a second switching unit that supplies the comparator with a temperature reference voltage and an attachment reference voltage; and
a control unit that controls the first and second switching units and controls charging of the battery based on the comparison result;
wherein the control unit performs a temperature scan that sequentially repeats a temperature estimation process, which connects the resistors having different resistances in the first switching unit, supplies the comparator with the temperature reference voltage from the second switching unit, and obtains the comparison result; and
the temperature scan includes, between the temperature estimation processes, an attachment detection process for a plural number of times, in which the attachment detection process supplies the comparator with the attachment reference voltage and compares the voltage at the connection node with the attachment reference voltage, and
wherein the second switching unit performs the attachment detection process using two attachment reference voltages in accordance with a connection state of the resistors in the first switching unit.

2. The charge control circuit of claim 1, wherein the attachment detection process is performed with the resistor used in the temperature estimation process performed at least either before or after the attachment detection process.

3. The charge control circuit of claim 1, wherein a positive input terminal of the comparator is connected to the connection node of the resistors and the thermistor, and a negative input terminal of the comparator is connected to the second switching unit.

4. The charge control circuit of claim 3, wherein the second switching unit supplies the comparator with the temperature reference voltage and at least two attachment reference voltages.

5. A battery charger, comprising:
a charge control circuit including:
a power supply that supplies a battery with current;
a plurality of resistor groups connectable to a thermistor for measuring a temperature of the battery;
a first switching unit that connects resistors having different resistances in series to the thermistor in the resistor groups;
a comparator that obtains a node voltage at a connection node of the resistors and thermistor and outputs a comparison result of the node voltage and a reference voltage;
a second switching unit that supplies the comparator with a temperature reference voltage and an attachment reference voltage; and
a control unit that controls the first and second switching units and controls charging of the battery based on the comparison result;
wherein the control unit performs a temperature scan that sequentially repeats a temperature estimation process, which connects the resistors having different resistances in the first switching unit, supplies the comparator with the temperature reference voltage from the second switching unit, and obtains the comparison result; and
the temperature scan includes, between the temperature estimation processes, an attachment detection process for a plural number of times, in which the attachment detection process supplies the comparator with the attachment reference voltage and compares the voltage at the connection node with the attachment reference voltage, and wherein the second switching unit supplies the comparator with the temperature reference voltage and at least two attachment reference voltages.

6. The battery charger of claim 5, wherein a positive input terminal of the comparator is connected to the connection node of the resistors and the thermistor, and a negative input terminal of the comparator is connected to the second switching unit.

* * * * *